United States Patent [19]

Wilkinson et al.

[11] 4,159,407

[45] Jun. 26, 1979

[54] METHODS AND APPARATUS FOR ELECTRICALLY MACHINING A WORK PIECE

[75] Inventors: Bernard H. Wilkinson, Skipton; Abdou H. Meleka; Derek A. Glew, both of Bristol, all of England

[73] Assignee: Rolls-Royce (1971) Limited, London, England

[21] Appl. No.: 806,063

[22] Filed: Jun. 13, 1977

Related U.S. Application Data

[63] Continuation of Ser. No. 559,436, Mar. 18, 1975, abandoned.

[30] Foreign Application Priority Data

Mar. 23, 1974 [GB] United Kingdom ............... 13029/74

[51] Int. Cl.2 ............................ B23P 1/04; B23P 1/08

[52] U.S. Cl. .............................. 219/69 M; 204/129.1; 204/129.75; 219/69 D

[58] Field of Search ............... 219/69 M, 69 D, 69 R, 219/69 G, 69 C, 69 V; 204/129.1, 129.25, 129.5, 129.75, 228

[56] References Cited

U.S. PATENT DOCUMENTS

| | | | |
|---|---|---|---|
| 2,796,509 | 6/1957 | Blake | 219/69 V |
| 3,275,538 | 9/1966 | Haupt et al. | 204/129.25 |
| 3,370,147 | 2/1968 | Matulaitis | 219/69 G |
| 3,385,947 | 5/1968 | Inoue | 219/69 M |
| 3,403,085 | 9/1968 | Berger et al. | 219/69 M |
| 3,417,006 | 12/1968 | Inoue | 219/69 M |
| 3,461,056 | 8/1969 | Maeda et al. | 219/69 M |
| 3,562,476 | 2/1971 | Rupert | 219/69 G |
| 3,616,344 | 10/1971 | Peterson et al. | 204/129.1 |

FOREIGN PATENT DOCUMENTS

| | | |
|---|---|---|
| 2175339 | 10/1973 | France. |
| 1032799 | 6/1966 | United Kingdom. |
| 1076171 | 7/1967 | United Kingdom. |
| 1076633 | 7/1967 | United Kingdom. |
| 1081902 | 9/1967 | United Kingdom. |
| 1159092 | 7/1969 | United Kingdom. |

*Primary Examiner*—Bruce A. Reynolds
*Attorney, Agent, or Firm*—Stevens, Davis, Miller & Mosher

[57] ABSTRACT

The production of passages in workpieces is described by an electrical method which simultaneously utilizes electrochemical and electrical discharge machining with a single electrode and dilute electrolytes. The method overcomes the metallurgical defects inherent in the recast layer left by electrical discharge machining which is removed by electrochemical machining. The method is particularly suited to producing cooling passages in the turbine blades of gas turbine engines and can be used to produce venturi shaped holes with rounded edges.

2 Claims, 19 Drawing Figures

| TEST Nº | DIA. OF HOLE FROM E.D.M. OPERATION | % Na Cl FOR E.C.M. ELECTROLYTE SOLN. | VOLTAGE FOR E.C.M. OPERATION | E.C.M. CURRENT | | TIME FOR E.C.M. OPERATION | FINISHED HOLE SIZE |
|---|---|---|---|---|---|---|---|
| | | | | START | FINISH | | |
| 1 | 0·017 inches | 3·0 % | 12·5 volts | 12·0 amps | 8·5 amps | 10·0 secs | 0·025 inches |
| 2 | 0·017 ·· | 3·0 % | 12·5 ·· | 13·0 ·· | 9·5 ·· | 15·0 ·· | 0·0275 ·· |
| 3 | 0·017 ·· | 2·0 % | 12·5 ·· | 13·0 | 8·0 ·· | 15·0 ·· | 0·0225 ·· |
| 4 | 0·017 ·· | 2·0 % | 12·5 ·· | 13·0 ·· | 9·0 ·· | 10·0 ·· | 0·020 ·· |
| 5 | 0·017 ·· | 1·0 % | 12·5 ·· | 9·0 ·· | 5·0 ·· | 15·0 ·· | 0·022 ·· |
| 6 | 0·017 ·· | 1·0 % | 12·5 ·· | 10·0 | 5·5 ·· | 18·0 | 0·024 ·· |
| 7 | 0·017 ·· | 0·5 % | 12·5 ·· | 7·0 ·· | 4·0 ·· | 15·0 | 0·020 ·· |
| 8 | 0·017 ·· | 0·5 % | 12·5 ·· | 9·0 ·· | 4·0 | 20·0 | 0·0215 ·· |
| 9 | 0·017 | 0·5 % | 12·5 ·· | 5·5 ·· | 2·5 ·· | 25·0 ·· | 0·022 ·· |

Fig. 6

| HOLE NUMBER | DEPTH | MEAN DIAMETER | MAXIMUM EXTERNAL RADIUS | MINIMUM EXTERNAL RADIUS | MAXIMUM EXTERNAL RADIUS | MINIMUM EXTERNAL RADIUS |
|---|---|---|---|---|---|---|
| | INCHES | INCHES | INCHES | INCHES | INCHES | INCHES |
| 109 | 0·035 | 0·015 | 0·004 | 0·004 | 0·0035 | 0·0035 |
| 110 | 0·073 | 0·015 | 0·015 | 0·0025 | — | — |
| 105 | 0·030 | 0·012 | 0·016 | — | — | — |
| 111 | 0·037 | 0·012 | 0·007 | 0·007 | 0·007 | 0·007 |
| 112 | 0·063 | 0·012 | 0·007 | 0·0035 | 0·0087 | 0·0025 |
| 108 | 0·050 | 0·012 | 0·008 | 0·004 | — | — |

Fig. 19

METHODS AND APPARATUS FOR ELECTRICALLY MACHINING A WORK PIECE

This is a Continuation of application Ser. No. 559,436 filed Mar. 18, 1975, abandoned.

The present invention relates to apparatus and methods for electrically machining a workpiece.

One well known electrical machining method relates to the removal of stock from a workpiece by spark erosion thereof and is called electrical discharge machining (E.D.M.). E.D.M. has proved very useful, and has been extensively used for producing apertures in workpieces which are often impossible to machine with conventional machine tools. One problem associated with E.D.M. is that the nature of spark erosion processes causes localized melting, which is followed by localized solidification of the workpiece forming a, so called, re-cast layer.

The re-cast layer is frequently cracked and of doubtful metallurgical quality and can thus give rise to high stresses and the subsequent initiation and propagation of fatigue cracks in the workpiece.

The present invention proposes apparatus for overcoming this problem by removing the re-cast layer by electro-chemical machining (E.C.M).

Electro-chemical machining of workpieces is itself also well known but even after it has been appreciated that E.C.M. may be used for removing the re-cast layer it is not generally possible, having produced an aperture by E.D.M., simply to remove the workpiece to an E.C.M. machine, and to provide suitably shaped electrodes for removing the re-cast layers.

This problem arises from the following considerations in order to carry out the E.C.M. operation it is necessary that the E.C.M. electrode conforms closely to the shape of the hole being machined. Shorting between the electrode and the workpiece must be avoided to prevent damage to either of them and large clearances between the electrode and the workpiece to overcome positional tolerances may result in extended and unpredictable machining times, wasteful of power and detrimental to the maintenance of accurate dimensions.

These problems reach an insuperable level once the size of apertures to be produced becomes very small. For example for aerospace applications it is often necessary to produce cooling passages in turbine blades or combustion chambers of the order of 0.020 inch diameter, for such passages electrodes of 0.015 inches diameter may be used and the mechanical strength of such electrodes is so small that they are easily bent and the accurate positioning of them in an existing small passage proves impossible.

According to the present invention there is provided apparatus for electrically machining a workpiece, the apparatus comprising an electrode, means for supporting the electrode in a jig which is fixed relative to the workpiece, means for moving the electrode relative to the workpiece and a power supply capable of establishing between the electrode and the workpiece an electrical circuit suitable for the removal of stock from the workpiece by both electrical discharge and electro-chemical machining and means for supplying to the workpiece a liquid or liquids suitable for said electrical discharge and electro-chemical machining.

The invention contemplates that under certain circumstances one liquid may act sufficiently like a dielectric for the electrical discharge machining and sufficiently like an electrolyte for electro-chemical machining.

One such liquid has been found to be tap water from the Barnolswick area of Yorkshire which has a conductivity of 154 micro mhos as measured on a Wayne Kerr bridge.

As Barnoldswick tap water is not readily available in many parts of the world, various other weak electrolytes have been tried in an attempt to reproduce the characteristics of the tap water.

We have now found that for producing cooling passages in a wrought turbine blade a solution of sodium sulphate of the same conductivity as the tap water was suitable.

We have further found that for producing cooling passages in a cast turbine blade a weak electrolyte formed by a mixture of solutions of potassium chloride and sodium acetate is suitable. The mixture is preferably in the ratio 5 to 1 by conductivity vis. 100 micro mhos of potassium chloride to 20 micro mhos of sodium acetate.

Also in accordance with the invention we have found it is now possible to vary the profile of the apertures produced by the electrodes during the machining process. This has enabled us to shape apertures in workpieces in a way not hitherto possible. Furthermore, the present invention is suitable for simultaneously producing a plurality of apertures in a workpiece.

The invention further comprises a method of producing apertures in a workpiece by electrical machining comprising the steps of:- advancing an electrode towards a workpiece using a stepping motor known per se for electrical discharge machining, supplying a dilute electrolyte to the electrode at its point of use on the workpiece, connecting a power supply between the electrode and the workpiece for supplying pulses of negative electrical potential to the electrode suitable for both electrical discharge and electrochemical machining, sensing the point of breakthrough of the electrode through the workpiece and continuing to supply pulses of electrical potential to the electrode for a predetermined time.

Preferably the method is applied to producing transverse cooling passages in a turbine blade of a gas turbine engine, said transverse cooling passages extending from the outer surface of the blade to an internally arranged longitudinal cooling passage and wherein on breakthrough, the speed of the pulse motor is slowed to allow sufficient time for the electrochemical machining of the bottom of the transverse cooling passages, but avoiding excessive travel of the electrode leading to electrical discharge machining of the blade on the far side of the said longitudinal passage.

The present invention will now be described by way of example only and with reference to the accompanying drawings wherein.

FIG. 6 is a table showing test results obtained with the apparatus of FIG. 1.

FIG. 14 is a detailed view of a part of the jig of FIG. 13.

FIG. 19 is a table setting out the characteristics of the various cooling passages shown in FIG. 18.

Figure 1:
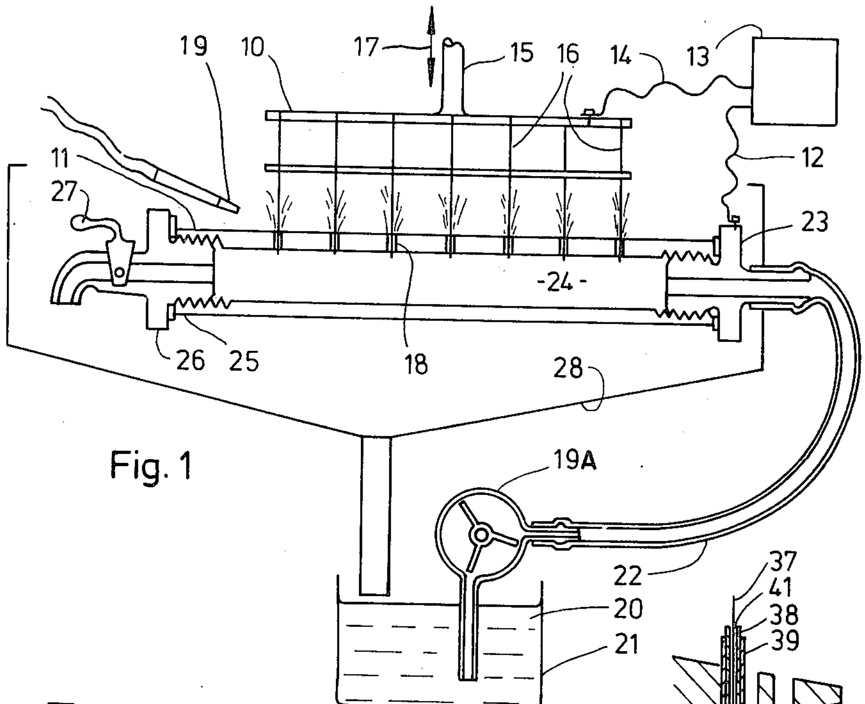
FIG. 1 is a sectional view through an apparatus according to the present invention.

Referring now to FIG. 1 there is shown an apparatus 10 for electrically machining a workpiece 11. The workpiece 11 which, in this embodiment, is a length of tube, is supported in a jig (not shown) and is connected by a lead 12 to one terminal of an electrical power supply 13. A second lead 14 from the power supply is connected to a tool 15 which includes several electrodes 16.

The tool 15 is of the kind well known per se for electrical discharge machining and may be constructed as is described and claimed in U.K. Pat. No. 1,341,911. The tool 16 is itself supported in a jig (not shown) fixed relative to the workpiece 11 and this jig is adapted to allow movement of the tool towards and away from the workpiece 11 as shown by the arrow 17. The jig may also be adapted to allow movements of the tool 15 in other directions as required.

Holes such as 18 are produced in the workpiece 11 by electrical discharge machining and during this process dielectric oil, comprising 3 parts odorless kerosene and 1 part Dow Corning silicone oil E.D.M. 1005, is sprayed over the electrodes and the workpiece from nozzle 19. The power supply 13 is adapted in the conventional way for E.D.M. to produce pulses of electricity between the tool and the workpiece having a peak amplitude of about 85 volts using a relaxation circuit of capacitance of 0.67 uf.

The power supply also includes a feedback circuit (well known per se for use with E.D.M. machines) by means of which the tool 15 is advanced towards the workpiece as machining progresses and the electrode is thus maintained in the correct working relationship with the workpiece. After the electrodes 16 have broken through the wall of the workpiece the electric discharge machining operation is stopped, the supply of dielectric oil ceases, but the electrodes 16 are left in position in the holes 18 in the workpiece. A pump 19A is now brought into operation to draw electrolyte 20 from a sump 21 and deliver it under pressure through the hose 22, and the union 23 to the interior 24 of the workpiece.

At one end 25 the workpiece has a second union 26 which is closable by a tap 27. Initially this tap may be opened for the electrolyte to flush out any dielectric from the interior of the workpiece 24. On closing the tap the electrolyte is forcibly expelled from the workpiece through each of the holes 18. The power supply is now used to provide a steady D.C. voltage between the electrodes 16 and the workpiece of 12 volts, the workpiece being the anode. Conditions are now right for electro-chemical machining of the holes 18 and this is continued for a suitable period until the re-cast layer from the electrical discharge machining operation has been removed from the walls of the holes 18.

The workpiece 11 may now be removed from the jig and a second workpiece substituted. The electrolyte escaping through the holes 18 is collected by an enclosure 28 which is funnel shaped for returning the electrolyte to the sump 21.

Contamination of the electrolyte by small amounts of dielectric oil is not a problem for the dielectric oil, being less dense than the electrolyte (a 0.5% solution of Na Cl in water) and also immiscible therewith, floats to the top of the sump 20 from which it may readily be removed.

It will be appreciated that the electrodes 16 may be of any desired cross-section and that following the E.D.M. operation there exists a gap of constant size around each electrode. Thus not only is the re-cast layer of substantially constant thickness but also, the invention, by using the already positioned electrode from the E.D.M. machining operation for the E.C.M. machining operation results in a substantially constant current density between the electrode and the workpiece, and the removal of substantially constant thickness of metal from the workpiece around the electrode.

The table of FIG. 6 shows the results achieved by using the apparatus of FIG. 1 in conjunction with a tubular workpiece comprising a nickel base alloy tube of 0.063 inch wall thickness.

The electrodes 16 comprised tungsten wires of 0.015 inch diameter and were used to produce holes such as 18 by E.D.M. of 0.017 inch diameter, the re-cast layer around these holes was 0.002 inch thick and nine tests were carried out with different strengths of electrolyte to determine the optimum conditions for the E.C.M. machining operation. It will be seen that for all the tests shown the E.C.M. current at the finish of the E.C.M. operation was lower than the starting current; this is readily explained by the increasing distance between the wall of the hole and the electrode as the E.C.M. machining operation progresses and increases the diameter of the hole.

Lower strength electrolytes (tests 7–9) are preferred as they permit finer control of the E.C.M. machining operation, the increased machining time is not believed to be significant for it is still small in relation to the total process time. The low machining current allows a very fine finish to be produced in the bore of the hole 18.

Figure 2:
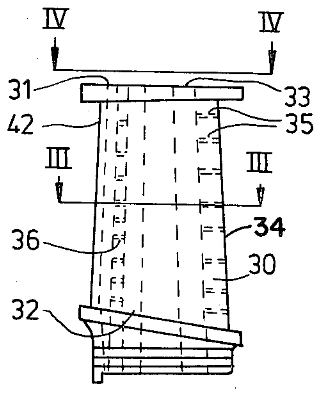
FIG. 2 is a side elevation of a turbine rotor blade.
Figure 3:
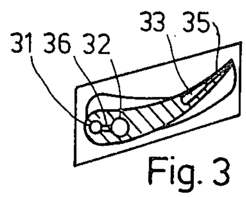
FIG. 3 is a cross-section of the blade of FIG. 2 taken on the line III—III.
Figure 4:
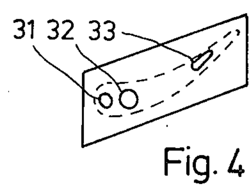
FIG. 4 is a plan view of the blade of FIG. 2 as seen in the direction IV—IV.

It will be understood that the apparatus of FIG. 1 may readily be adapted to drilling cooling passages in gas turbine rotor and stator blades. Referring now particularly to FIGS. 2, 3 and 4 there will be seen a gas turbine rotor blade 30 having three longitudinal cooling passages 31, 32, 33 respectively. The elongate passage 33, itself produced either by casting or by E.D.M., cools the trailing edge 34 of the blade via plurality of holes 35.

The holes 35 may readily be produced by the present invention. Plugs (not shown) may be produced to connect the cooling passage 33 to the electrolyte supply in similar manner to that described with reference to FIG. 1.

Figure 5:
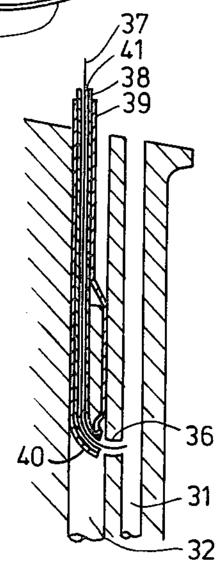
FIG. 5 is a part longitudinal section of the blade of FIG. 3 on the line V—V.

Longitudinal cooling passages 31 and 32 are themselves connected by transverse holes 36 which may be produced by E.D.M. using electrode 37 shown in FIG. 5 and described and claimed in our copending U.S. patent application No. 545,557, now U.S. Pat. No. 3,995,134. The electrode 37 is passed down a narrow bore stainless steel tube 38, insulated from the blade at 39, and having a radius 40 at one end. The stainless steel tube deflects the electrode 37 through substantially 90° for producing the transverse hole 36. It will be understood that after producing a hole 36 by E.D.M. and without removing or disturbing the electrode 37 a source of electrolyte may be connected to the passages 31 and 32 in the blade and also to the bore 41 of the stainless steel tube for flushing out any dielectric oil present and to permit subsequent removal of the re-cast layer by E.C.M. as previously described.

In some blades (not shown) further cooling holes pass from the longitudinal passage 31 to the leading edge 42, of the blade and it will be appreciated that these may be produced in a similar manner to the holes 35.

We have also found that liquids exist which are suitably dielectric for E.D.M. operation and sufficiently electrolytic for E.C.M. operation. By using one of these liquids not only can the delays involved in the flushing operation be avoided but also the E.D.M. and E.C.M. operations can be carried out simultaneously.

Figure 7:
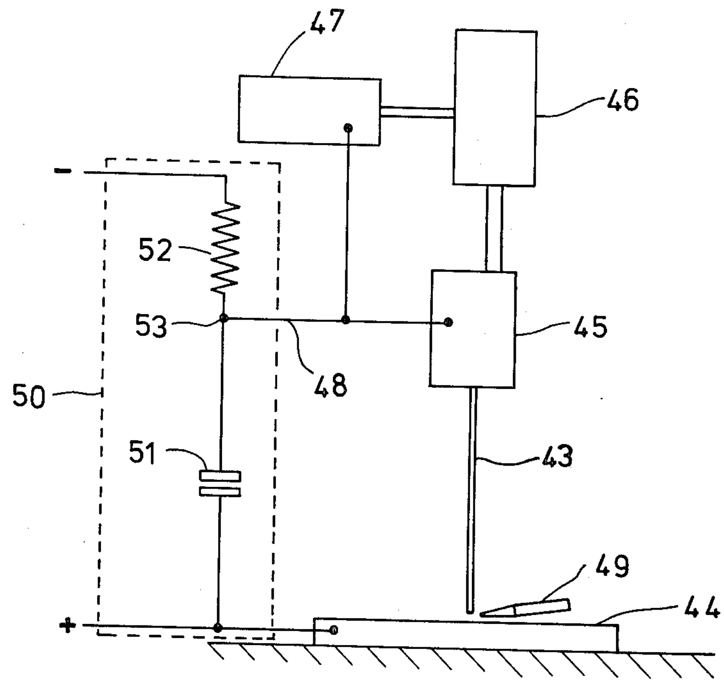
FIG. 7 is a schematic view of a further embodiment of the invention.

Turning now to FIG. 7, there is shown a tungsten electrode 43 and a workpiece 44 included in an electrical circuit wherein the workpiece has a positive potential relative to the electrode.

Electrode 43 is connected via a collect chuck and carriage, shown diagrammatically at 45, to a stepping motor 46 and in operation the stepping motor moves the carriage and thus the electrode towards and away from workpiece 44.

A digital servo amplifier 47 is connected to the output line 48 for the electrode so as to receive signals proportioned to the potential at the electrode which will actuate it and so cause the stepping motor to retract the electrode 43 a given distance away from workpiece 44 in analogous fashion to conventional electrical discharge machining practice.

An electrolyte supply (not shown) is provided and piped to a nozzle 49 for ejection between the workpiece and electrode end.

The electrolyte used in tap water, drawn from the Barnoldswick area of Yorkshire, England, which is a relatively weak electrolyte having a conductivity of 154 micro mhos (as measured by a Wayne-Kerr bridge circuit in a standard conductivity test cell). It is however possible to use other weak electrolytes.

In particular we have found a solution of sodium sulphate in deionized water having a conductivity of 154 micro mhos i.e., the same as for the Barnoldswick tap water, is suitable for producing holes in wrought turbine blade materials such as a Nickel base alloy with 20% Cobalt, 15% Chromium, 5% Molybdenum. 5% Al and 12% Titanium. However, this same solution is not good for use with cast turbine blade materials of composition 10% Cobalt, 10% Tungsten, 9% Chromium and the balance Nickel because it leads to a preferential tendency to remove the interdendritic material yielding a rough surface. For use with cast turbine blade materials we have found the best liquid to be a mixture of potassium chloride and sodium acetate solutions with deionized water. The mixture is in the ratio 5 to 1 by conductivity vis. 100 micro mhos of potassium chloride to 20 micro mhos of sodium acetate.

The electrical circuit between the workpiece and the electrode not only supplies the steady D.C. level desirable for electrochemical machining but has superimposed on this D.C. level a periodically varying voltage for electrical discharge machining.

In order to provide the periodically varying voltage for electrical discharge machining the circuit includes a relaxation oscillator 50 which comprises a capacitor 51 connected between positive and negative terminals and in parallel with electrode 43 and a resistor 52 connected between the capacitor and the negative terminal of the circuit. The output to the electrode 43 is connected at 53 on the line from capacitor 51 to resistor 52.

In operation, electrical power is switched on and a constant flow of electrolyte is passed between electrode 43 and workpiece 44.

Electrode 43 is simultaneously moved by stepping motor 46 towards workpiece 44 and when the spacing between them is for example 0.005 inches electrochemical machining of the workpiece commences. The electrode continues to move towards the workpiece until they are about to touch whereupon capacitor 51 discharges the electricity it has received and stored whilst electrochemical machining has been taking place. The discharge reacts on the workpiece at the contact point of the workpiece with the electrode and electrical discharge machines a small portion of metal there, which is washed away by the electrolyte.

The discharge of the capacitor generates a signal which is collected from output 53 by servo amplifier 47 which is actuated by the signal and causes stepping motor 46 to reverse and withdraw electrode 43 a distance of 0.005 inches from the newly machined surface of workpiece 44. On having withdrawn the electrode the said distance, the stepping motor again changes its direction of operation and commences to move the electrode towards workpiece 44 all the while electrochemically machining it, and so as to obtain further contact therewith and cause a further discharge of capacitor 51, which will superimpose a further pulse of electricity on to the circuit and attain further electro-discharge machining of the workpiece.

It will be understood, however, that the size of the resistor controls the size of the D.C. voltage applied between the electrode and the workpiece when the capacitor has discharged. It is therefore possible by changing the size of the resistor and thus this D.C. voltage to vary the proportion of the electrical machining carried out by electrochemical machining relative to the proportion carried out by electrical discharge machining. By varying the relative proportions of machining carried out by electrochemical and electrical discharge methods the shape of the apertures produced by the electrode may be varied.

Figures 8, 9, 10, 11, 12, 15:
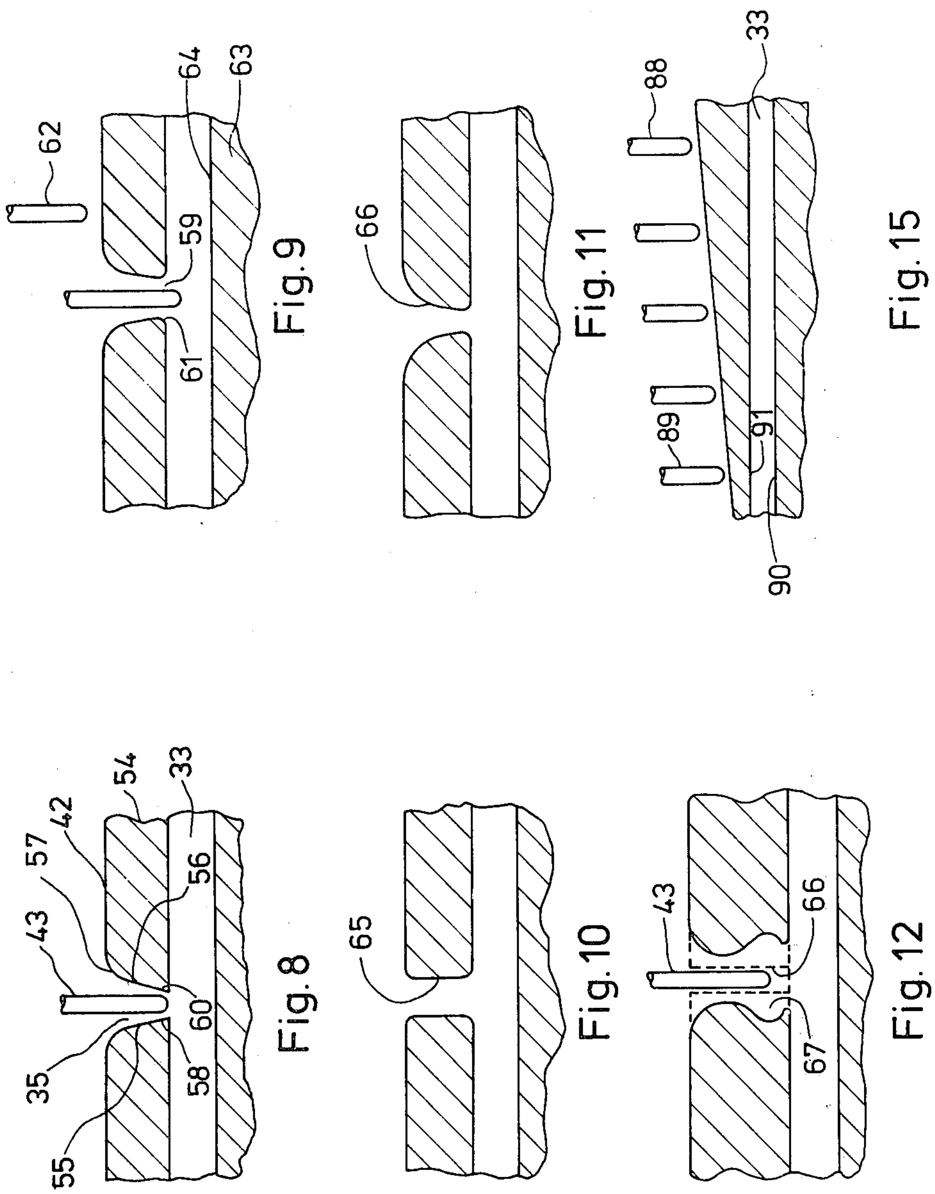
FIG. 8 is a section through a partially produced hole in a workpiece.
FIG. 9 is a further section through the hole of FIG. 8 taken at a later stage in its production.
FIG. 10 is a section through a hole of a different shape.
FIG. 11 is a section through a further differently shaped hole.
FIG. 12 is a section through a yet further differently shaped hole.
FIG. 15 illustrates an arrangement for simultaneously producing multiple holes in a workpiece.

Turning now to FIGS. 8 and 9, typical sections through an aperture produced by a cylindrical electrode are shown. The workpiece in each case is part of a section taken through a gas turbine engine rotor blade illustrating the production of cooling aperture 35 between the blade surface 42 and an internal cooling passage 33.

In FIG. 8 the electrode 43 is at the point at which it breaks through the wall 54. It will be seen that the aperture 35 is generally conical in shape with a radiused outer edge. This shape occurs because the electrical discharge machining takes place on the material ahead of the electrode, whereas electrochemical machining takes place on the side walls 55, 56 of the hole. Thus as the electrode passes through the blade material the material near the outer surface 42 is subjected to electrochemical machining for a longer time than that near the bottom of the hole. The radiusing of the outer edge 57 of the hole is assisted by electrochemical action during the period in which the drilling tool is advanced towards the workpiece prior to any electrical discharge machining taking place and by the concentration of the electric field lines at the edge of the hole.

At the bottom of the hole at breakthrough there is a certain amount of the recast layer 58 from the electrical discharge action which is removed in the following way. The point of breakthrough of the electrode is sensed electrically as later described and the stepping motor speed is slowed down but still continues to advance the electrode into the passageway 33 to the position shown in FIG. 9. During this period no electrical discharge machining takes place because the distance between the electrode and the workpiece is too large to allow sparking to take place. However, electrochemical machining continues until the base of the hole 59 has been opened out to the desired metering orifice, the recast layer 58 is removed and the sharp edges 60 of the hole (FIG. 9) formed into the radiused edges 61. In practice this operation takes only a few seconds and a timing device initiated by the breakthrough signal is used to determine the depth the electrode reaches before it is withdrawn from the hole and indexed to the next position 62.

The timing device, which is preset for a required time, also ensures the electrode does not reach the opposite wall 63 and commence electrical machining of the back wall 64 of the hole. The action of continuing to move the electrode through the hole during the last part of the cycle assists in breaking up the hydroxides formed during the drilling process so that they may be dissipated by the inflowing electrolyte.

As can be seen from FIGS. 10 and 11 the shape of the holes can be varied. This is achieved by changing the resistor 52. Thus, if the majority of the hole producing operation takes place by electrical discharge machining i.e., a high value of resistor 52 then the much more parallel hole 65 of FIG. 10 is produced. Alternatively, if the emphasis is on producing sharply converging venturi shaped holes such as 66, FIG. 11, then the value of the resistor is decreased and the electrochemical machining operation takes precedence.

It will be understood that the proportion of machining carried out electrochemically can also be increased by increasing the strength of the electrolyte. This fact can be used to produce rather more unusual shaped apertures as seen in FIG. 12.

In FIG. 12 the electrode has been advanced into the workpiece first of all using either a relatively weak electrolyte or a dielectric and a value of the resistor 52 such that a parallel hole 66 is produced in the workpiece.

The electrolyte is then changed for a stronger electrolyte and partially withdrawn from the hole. During electrochemical machining the cavity 67 is produced and any residual recast layer left from the previous operation is removed.

It will be understood by those skilled in the art, that a large variety of shapes of holes or apertures can be produced by variations on the proportions; of machining carried out by electrochemical and electrical discharge methods.

As is usual in electrical discharge machining we have found a degree of longitudinal vibration of the electrode improves the drilling process. Furthermore, we have found that flowing the electrolyte through the guide tube gives significantly better results than are achieved by directing the flow to the drilling point using the nozzle 68 of FIG. 14. Both these features are shown in FIG. 13 which is a detailed view of a suitable mechanical arrangement.

Figure 13:
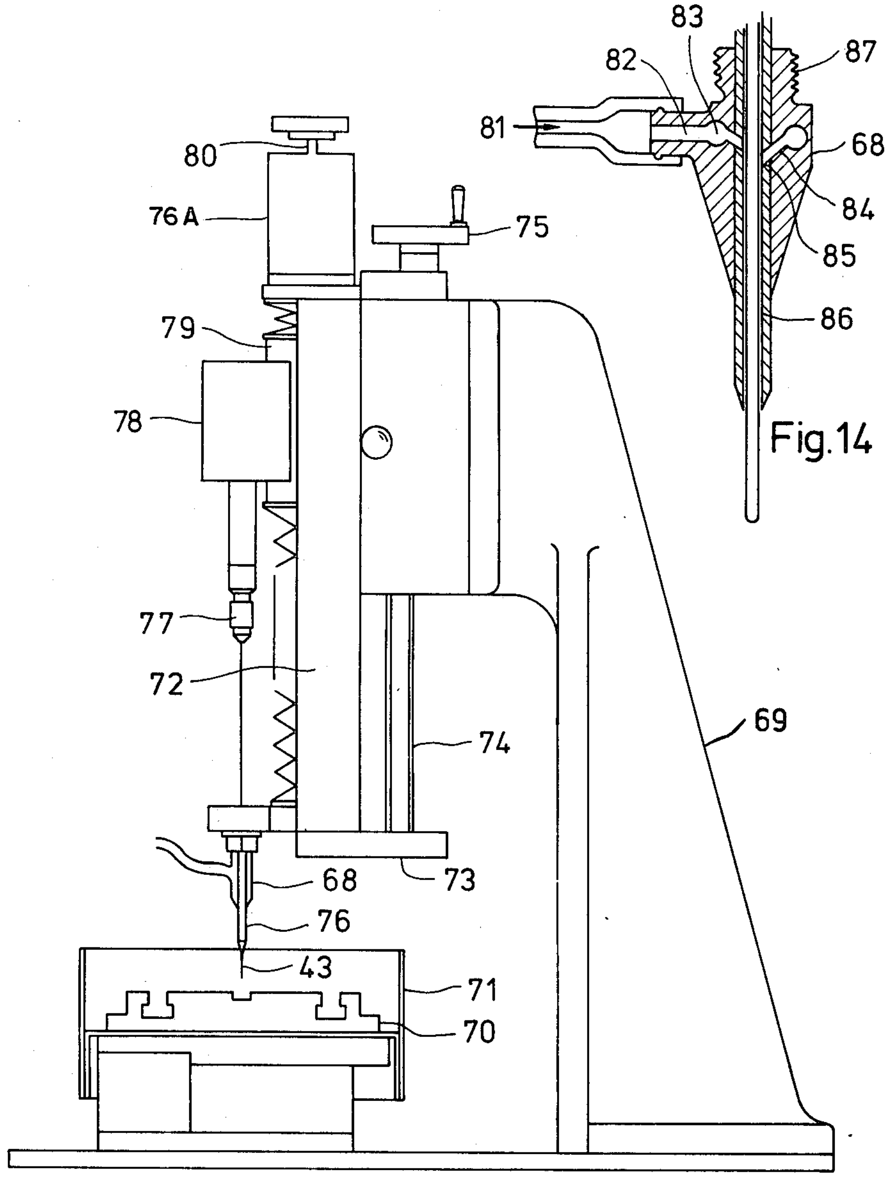
FIG. 13 is a detailed side elevation of a jig for supporting the electrode relative to a workpiece.

As seen in FIG. 13, a machine bed 69 supports worktable 70 surrounded by an enclosure 71 for collecting spent electrolyte. A vertically disposed guide member 72 is movably connected to the machine bed via a base 73 and a screw threaded bar 74. The vertical position of the guide member is adjustable during initial setting up by rotating the handwheel 75 which is directly attached to the screw threaded bar 74. The base 73 supports at it's lower end a fixed guide tube 76 through which the electrode 43 passes. The electrode 43 is held at its uppermost end in a collett chuck 77 which is attached to a vibrator 78 which applies longitudinal vibrations to the electrode. The vibrator is itself connected to a carriage 79 which runs in a dovetailed slot (not shown) in the guide member and the carriage is propelled via a screw threaded rod 80 driven by the stepping motor 76A. In this way the vibration of the electrode is superimposed on the movement thereof caused by the stepping motor.

Surrounding the fixed guide tube 76 is the collar 68 firmly attached to the base 73 to avoid bending the guide tube. The collar which is shown in more detail in FIG. 14 is used to supply the electrolyte to the electrode.

From FIG. 14 it can be seen that electrolyte flows into the collar in the direction of the arrow 81 and passes via a passage 82 to an annular chamber 83. From the annular chamber radially inwardly and downwardly directed passages 84 are aligned with similar passage 85 in the guide tube to flow electrolyte down the inside of the guide tube in the space 86 between the electrode and the guide tube. In this manner a forceful stream of electrolyte is flowed down the outside of the electrode. The better direction of the electrolyte has the further advantage that stray current attack on the workpiece is minimised.

The collar 68 is provided with a screw thread 87 at its upper end for firmly connecting it to the base 73.

In a variation of the invention (not shown) the electrically driven stepping motor is replaced by a hydraulically driven one, incorporating an oscillating spool valve for moving the carriage 79 backwards and forwards during the drilling process.

Spark breakthrough is determined in one of two ways. For relatively short holes a voltage sensitive device measuring the peak potential between the electrode and the workpiece can be used. Prior to electrical discharge drilling taking place, this potential will be of the order of 120 volts, but, as the electrode approaches the workpiece and electrical discharge drilling takes place, the potential will fall to approximately 40 volts. However, on breakthrough the potential will rise again to around 120 volts. The change in potential at breakthrough is then used as the signal to slow the speed of the pulse motor.

For relatively deep holes, of say a length to mean diameter ratio greater than 20 to 1 the voltage change is not sufficiently distinct and it is better to sense breakthrough by measuring the frequency at which electrical spark discharge takes place. On breakthrough this frequency will rapidly drop from a high frequency to a low frequency and a suitable electrical circuit (not shown, but well known per se) may be employed to switch means for slowing the pulse motor.

The apparatus shown in FIG. 13 may readily be modified to enable a plurality of holes to be drilled at once. In order to achieve this, it is necessary to provide a plurality of guide tubes 76 and some device for feeding the electrodes through the guide tubes. Such means are known in the art, and employed for conventional electrical discharge drilling.

We have found that use of multiple electrodes can lead to certain undesirable effects. For example, considering the blade of FIG. 15, it will be seen that the last electrode 88 has a larger thickness of workpiece to drill through than the electrode 89, thus, if all the electrodes are moved together by the time breakthrough of electrode 88 into the passage 33 is achieved electrode 89 is starting to machine the rear face 90 of the passage 33. This can be overcome by switching off the power to electrode 89 a predetermined time after its breakthrough the wall at 91 has been sensed.

Figure 16:
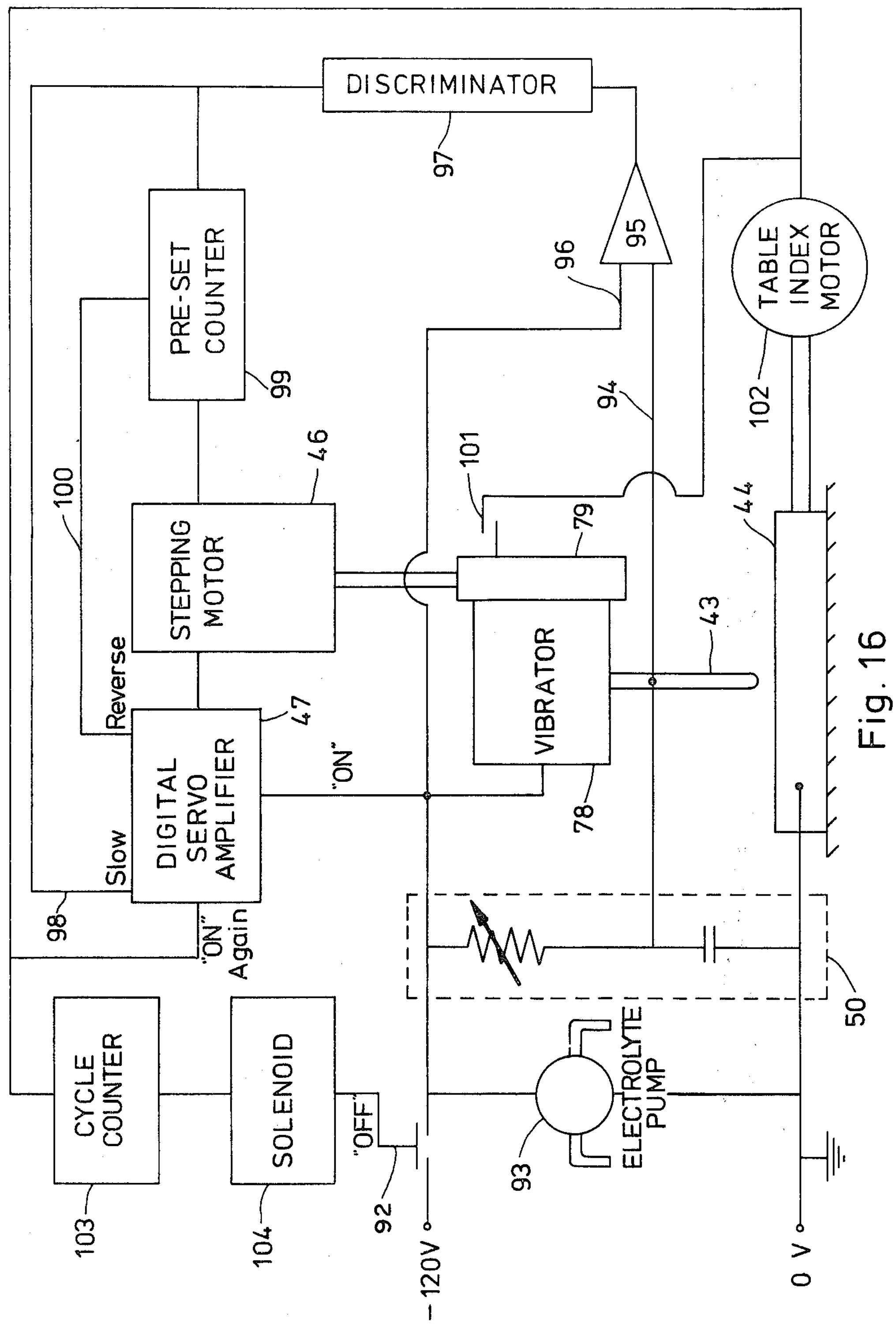
FIG. 16 is a block diagram of the electrical circuitry in conjunction with the apparatus of FIG. 13.

Turning now to FIG. 16 a block diagram of the electronic circuitry used to carry out the above described method. The content of each of the blocks is not described in detail but the construction of each block will be well understood by those skilled in the art.

Initiation of a drilling cycle is effected by manually pressing the start button 92. This simultaneously switches on the electrolyte pump 93, the relaxation oscillator 50, the digital servo amplifier 47 and the vibrator 78. The digital servo amplifier initiates the movement of the stepping motor 46 which feeds the electrode 43 towards the workpiece 44.

As machining commences the voltage seen at the input 94 of the operational amplifier 95 falls relative to the open circuit potential seen at the other input 96. An output signal from the operational amplifier is generated and passed to a discriminator 97 which ignores it. At breakthrough the potential at the input 94 rises to substantially the value at the input 96 and the operational amplifier shuts off. The discriminator 97 senses this and its output 98 to the digital servo amplifier results in a slowing of the speed of the stepping motor. Simultaneously with this slowing a counter 99 is initiated which can be preset to allow only a certain number of steps of the stepping motor. The preset number of steps therefore determines the time that machining carries on after breakthrough of the electrode 43. At the end of this period the counter has an output 100 to the digital servo amplifier 47 which in turn tells the stepping motor to reverse and withdraw the electrode. When the electrode has been withdrawn from the workpiece a microswitch 101 is contacted by the carriage 79 and an output signal is passed both to the index motor 102 for the workpiece 44 and to the digital servo amplifier 47 which then initiates a further cycle of the stepping motor operation for machining a further hole in the workpiece. A cycle counter 103 counts the total number of holes drilled and when this reaches a pre set number the cycle counter 103 energizes a solenoid 104 to switch off the start button 92 and initial data are reset for commencing to machine a second workpiece.

Figure 17:
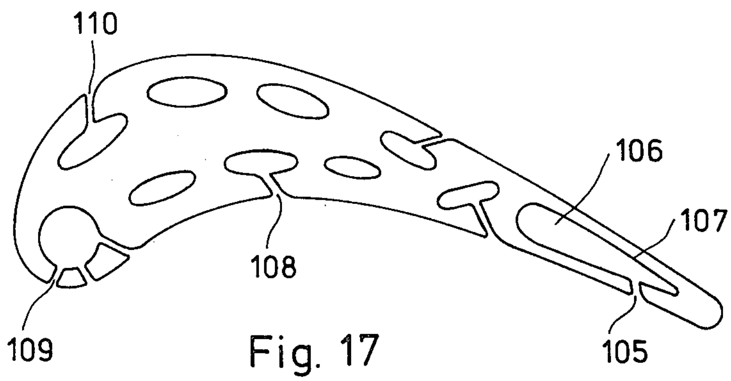
FIGS. 17 and 18 are sections through respective wrought and cast gas turbine rotor blades.
Figure 18:
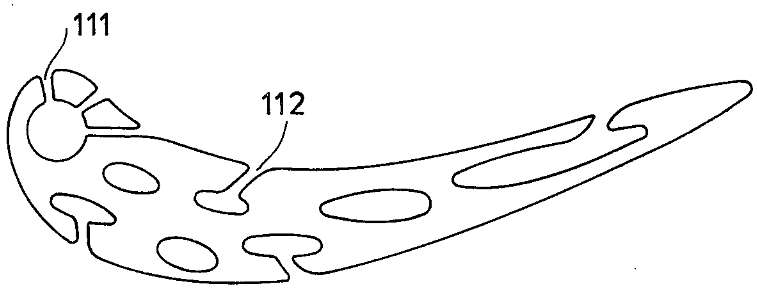

Turning now to FIGS. 17 and 18, sections through a respective wrought and cast gas turbine rotor blades are shown in which various apertures produced by the above described technique are illustrated. The table of FIG. 19 shows the relative dimensions of such apertures.

It will be noted from FIG. 17 that passage 105 enters a longitudinal cooling slot 106 at a very oblique angle and great care must be taken in this case to avoid machining the rear wall 107 of the longitudinal cooling slot. This is achieved by promptly switching off the power to the electrode when breakthrough is achieved.

We have found typical apertures produced by the above described techniques can be readily inspected by optical microscopes in order to determine the surface finish of the walls of the apertures, to measure the metering diameter at the bottom of each aperture and to check for unwanted machining of the back face of longitudinal passages.

The method of machining described herein has proved very successful in the production of air ejection passages in air cooled turbine blades for jet propulsion engines. The conical profile of the holes ensures that cooling air which in operation flows in a direction from apex to base of the conical shape, diffuses so as to give maximum area cooling, rather than mere cold spot cooling as is obtained with parallel sided holes.

What we claim is:

1. A method of electrically machining a workpiece comprising the steps of advancing and electrode towards a workpiece, supplying a dielectric liquid to the workpiece at the point of use of the electrode on the workpiece, supplying electrical power to the electrode for removal of stock from the workpiece by electrical discharge machining, and characterized in that the method further comprises the steps of maintaining the relative alignment of the electrode and the workpiece, removing the dielectric liquid from the workpiece, supplying electrolyte to the electrode at its point of use on the workpiece and supplying the electrical power to the electrode for removing further stock from the workpiece by electrochemical machining.

2. Apparatus for electrically machining a workpiece, the apparatus comprising an electrode, means for supporting the electrode in a jig fixed relative to the workpiece, means for moving the electrode relative to the workpiece and a power supply capable of establishing between the electrode and the workpiece an electrical circuit suitable for the removal of stock from the workpiece by both electrical discharge machining and electrochemical machining, means for supplying a dielectric liquid to the point of use of the electrode on the workpiece for producing in combination with said electric circuit a first aperture by electrical discharge machining, and means for removing the dielectric liquid and supplying electrolyte through the aperture for enlarging the aperture by electrochemical machining without substantially disturbing the alignment of the electrode in the aperture.

* * * * *